United States Patent
Ziegler

(10) Patent No.: US 8,996,447 B2
(45) Date of Patent: Mar. 31, 2015

(54) DECISION SERVICE MANAGER

(71) Applicant: Carsten Ziegler, Walldorf (DE)

(72) Inventor: Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/277,380

(22) Filed: May 14, 2014

(65) Prior Publication Data

US 2014/0250306 A1 Sep. 4, 2014

Related U.S. Application Data

(63) Continuation-in-part of application No. 13/477,526, filed on May 22, 2012, now Pat. No. 8,832,018.

(30) Foreign Application Priority Data

May 16, 2013 (EP) .................................... 13168010

(51) Int. Cl.

| G06F 17/00 | (2006.01) |
| G06N 7/00 | (2006.01) |
| G06N 7/08 | (2006.01) |
| G06F 21/44 | (2013.01) |
| G06F 21/60 | (2013.01) |
| G06F 9/445 | (2006.01) |

(52) U.S. Cl.
CPC .............. *G06F 21/44* (2013.01); *G06F 21/602* (2013.01); *G06F 8/60* (2013.01)
USPC .......................................................... 706/59

(58) Field of Classification Search
USPC .......................................................... 706/59
See application file for complete search history.

(56) References Cited

U.S. PATENT DOCUMENTS

| 7,350,033 | B2 | 3/2008 | Hofmann et al. |
| 7,475,088 | B2 | 1/2009 | Ziegler |
| 7,702,696 | B2 | 4/2010 | Ziegler |
| 7,774,319 | B2 | 8/2010 | Schweigkoffer et al. |
| 7,797,708 | B2 * | 9/2010 | Weber et al. ................... 719/313 |
| 7,937,354 | B2 * | 5/2011 | Brelage et al. .................. 706/47 |
| 7,962,436 | B2 * | 6/2011 | Brelage et al. .................. 706/47 |
| 8,020,051 | B2 * | 9/2011 | Ziegler ........................... 714/57 |

(Continued)

OTHER PUBLICATIONS

Autonomous Real-Time Navigation for Service Level Agreement in Distributed Information Service System, Mahmood, K. ; Niki, S. ; Nakahara, Y. ; Xiaodong Lu ; Luque, I. ; Mori, K. Autonomous Decentralized Systems, 2007. ISADS '07. Eighth International Symposium on DOI: 10.1109/ISADS.2007.24 Publication Year: 2007 , pp. 231-238.*

*Primary Examiner* — Michael B Holmes
(74) *Attorney, Agent, or Firm* — Fish & Richardson P.C.

(57) ABSTRACT

A decision service manager authenticating at a managed system hosting a decision service, in case of a successful authentication, the decision service manager sending a first status request to the managed system and receiving, in response to the first status request, a first indication of a current status of the managed system and authenticating at a target managed system, in case of a successful authentication at the target managed system, the decision service manager sending a second status request to the target managed system and receiving a second indication of a current status of the target managed system, the decision service manager performing a deployment readiness check comprising comparing the first and the second indication, and if a current status of the target managed system allows the target managed system to host the decision service, automatically deploying the decision service to the target managed system.

21 Claims, 9 Drawing Sheets

(56) References Cited

U.S. PATENT DOCUMENTS

| | | |
|---|---|---|
| 8,108,331 B2 * | 1/2012 | Ziegler et al. ............... 706/47 |
| 8,196,126 B2 * | 6/2012 | Ziegler ........................ 717/153 |
| 8,433,664 B2 * | 4/2013 | Ziegler et al. ............... 706/15 |
| 8,448,194 B2 * | 5/2013 | Ziegler ........................ 719/330 |
| 8,601,490 B2 * | 12/2013 | Sureshan et al. ............ 719/313 |
| 8,626,543 B2 * | 1/2014 | Liu et al. ..................... 705/7.11 |
| 8,630,969 B2 * | 1/2014 | Ziegler ........................ 706/47 |
| 8,712,990 B2 * | 4/2014 | Ziegler ........................ 707/707 |
| 8,832,018 B2 * | 9/2014 | Ziegler ........................ 706/59 |
| 2011/0282829 A1 | 11/2011 | Rangaswamy et al. |

* cited by examiner

FIG. 3A

Decision Service Manager

Save | Cancel | Overview

▼ Managed Systems | New

| System Name | Description | RFC Destination | Created On | Created By |
|---|---|---|---|---|
| ERP_WORL | ERP for Rest of World | YI4_070 | 01/15/2012, 08:05:25 | ZIEGLERCA |
| ERP_BRAZL | ERP in Brazil | YI3_070 | 01/30/2012, 04:58:41 | BAERMI |
| FI_EMEA | Financials in Europe | UIX_080 | 01/25/2012, 05:19:54 | ZIEGLERCA |
| FI_US | Financials in North America | UIZ_080 | 01/03/2012, 11:26:14 | ZIEGLERCA |
| HCM_GLOBAL | HCM Global System | ISP_050 | 01/22/2012, 07:11:24 | BAERMI |

Details: FI_EMEA, Financials in Europe

Deployment | Applications | Technical Information — 306

System ID: UIX
Client: 080
User: ZIEGLERCA
Deployment Readiness Status: Ready

Installed Components: XYZ ECC 6.0
Operating System: Linux
Machine Type: UIX_080
Database System: MaxDB 302
304
300a

FIG. 3C

Decision Service Manager

[Save] [Cancel] [Overview]

▼ Managed Systems

| System Name | Description | RFC Destination | Created On | Created By |
|---|---|---|---|---|
| ERP_WORL | ERP for Rest of World | YI4_070 | 01/15/2012, 08:05:25 | ZIEGLERCA |
| ERP_BRAZL | ERP in Brazil | YI3_070 | 01/30/2012, 04:58:41 | BAERMI |
| FI_EMEA | Financials in Europe | UIX_080 | 01/25/2012, 05:19:54 | ZIEGLERCA |
| FI_US | Financials in North America | UIZ_080 | 01/03/2012, 11:26:14 | ZIEGLERCA |
| HCM_GLOBAL | HCM Global System | ISP_050 | 01/22/2012, 07:11:24 | BAERMI |

Details: FI_EMEA, Financials in Europe

[ Deployment | Applications | Technical Information ]

[ Deploy | Deployment Readiness Check | Generated Classes ]

| Service | Deployment Timestamp | Source System Information | Valid From | Valid To | Traces | Generation Status | Delete |
|---|---|---|---|---|---|---|---|
| ▼ SERV_A (Service A...) | | | | | | | |
| | 01/25/2012, 05:19:54 | QPT (200), ZIEGLERCA | 01/25/2012, 05:19:54 | unlimited | Show(1) | ok | 🗑 |
| | 01/25/2012, 05:05:11 | QPT (200), ZIEGLERCA | 01/20/2012, 05:19:54 | 01/25/2012, 07:19:54 | Show(1) | Regenerated | 🗑 |
| | 01/25/2012, 05:01:39 | QPT (200), ZIEGLERCA | 01/15/2012, 05:35:54 | 01/19/2012, 06:11:12 | Show(1) | Regenerated | |
| ▼ SERV_B (Service B...) | | | | | | | |
| | 01/25/2012, 05:19:54 | QPT (200), ZIEGLERCA | 01/25/2012, 10:12:34 | unlimited | Show(1) | ok | |
| | 01/25/2012, 05:05:11 | QPT (200), ZIEGLERCA | 01/25/2012, 05:19:54 | 01/25/2012, 08:19:54 | Show(1) | Regenerated | 🗑 |

302 — Decision Service Manager
304 — Managed Systems
310 — Deployment
312 — Deploy / Service rows 300c

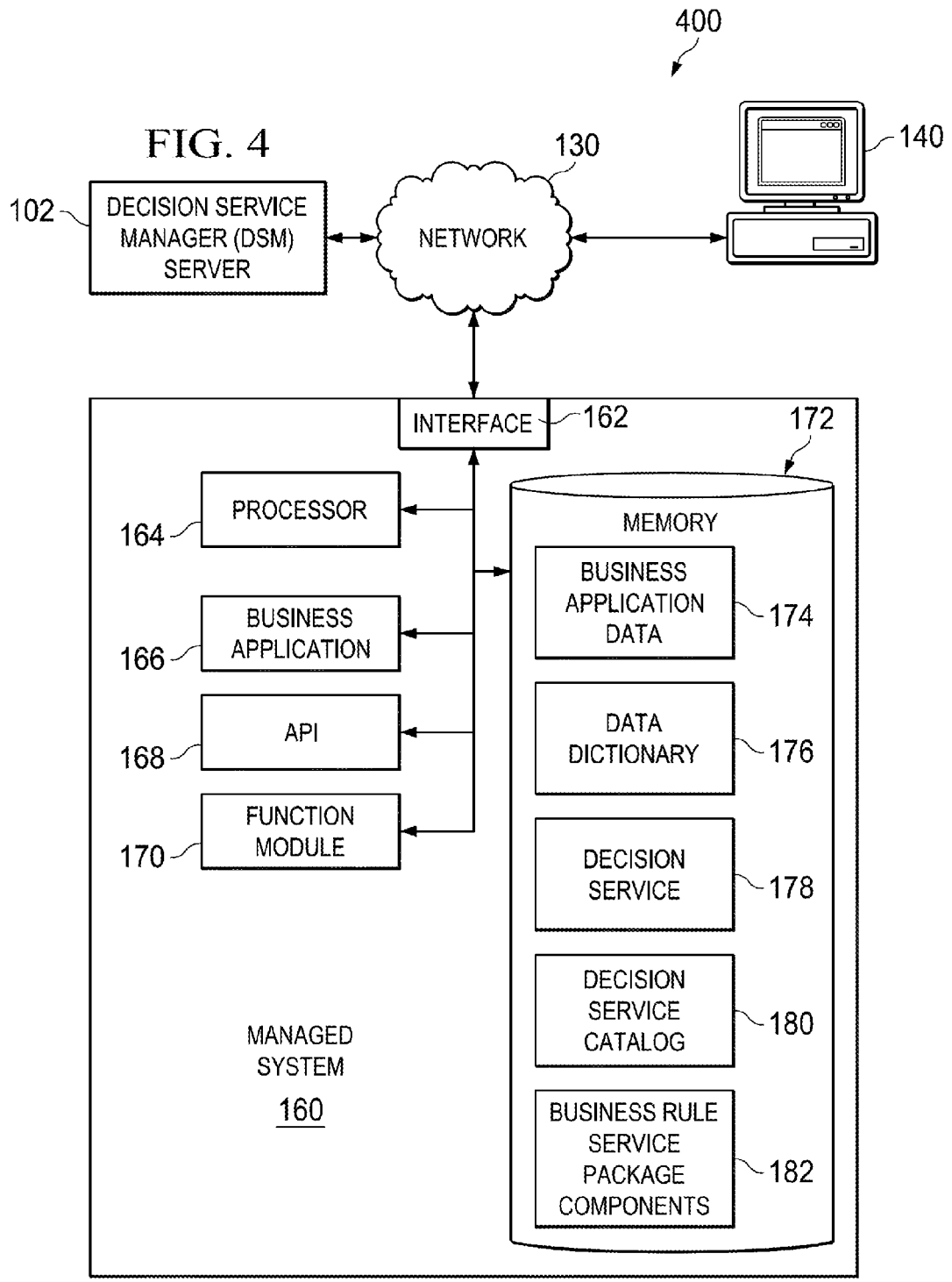

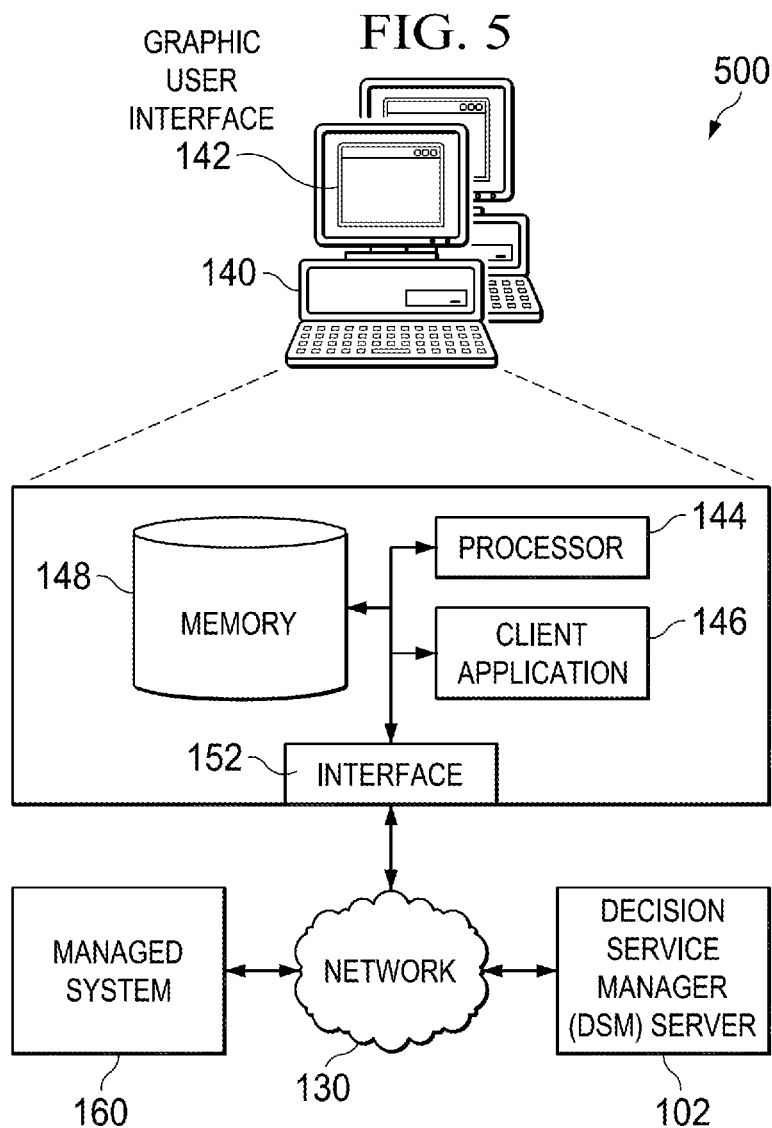

DECISION SERVICE MANAGER

CLAIM OF PRIORITY

This application claims priority under 35 USC §120 to U.S. patent application Ser. No. 13/477,526, filed on May 22, 2012, and also claims priority under 35 USC §119(b) to European Patent Application Serial No. 13168010.0 filed on May 16, 2013; the entire contents of which are hereby incorporated by reference.

TECHNICAL FIELD

The present disclosure relates to computer-implemented methods, software, and systems for modeling and deploying decision services.

BACKGROUND

Updates to decision services, e.g., business logic, are typically resisted by organizations due to complexity, high cost, and lack of agility to perform even minor updates to the decision services. These factors are normally affected by the use of a three-system landscape for decision service updating: 1) development; 2) quality assurance; and production; coupled with the use of a change and transport system (CTS) to migrate decision service changes between each system. The CTS normally requires specialized technical personnel to perform the migration of decision service changes between the development, quality assurance, and production systems, therefore excluding business experts. The use of the three-system landscape and the need for specialized technical personnel for the CTS increases complexity and cost for an organization. The CTS also requires a period of downtime during decision service migration where the system is unavailable until the updates are complete. The CTS also normally introduces rigid timeframes that are established between CTS migration events. These downtime periods and fixed timeframes affect the organizations' ability to quickly make changes to a production system and an overall agility to adapt to changing business or other conditions. As a result the organizations often seek alternative solutions to perform decision service updates.

SUMMARY

The present disclosure relates to computer-implemented methods, software, and systems for modeling and deploying decision services.

A "managed system," as used herein, is any business application (e.g., ERP, CRM, business intelligence system, or enterprise portal) managed by a centralized system management suite such as, for example, the SAP Solution Manager. SAP Solution Manager provides for features such as Central System Administration, Project Management, Test Management, System Monitoring, Business Process Monitoring, Change Management (Change Request Management & Maintenance Optimizer) and other functionalities.

A "decision service," as used herein, is any kind of program logic comprising an interface for calling said program logic and for returning a data processing result. The result may comprise, for example, one or more numbers, strings, or binary data objects. Preferentially, a decision service provides one or more checks, e.g., validation operations, mathematical calculations, groupings, matchings or classifications. Some examples for decision services may be, without limitation: relationship based pricing, credit decisioning and scorecard based decisioning; fee calculations, course selections; patient monitoring, fraud detection, claim processing and management; parts management, duties calculations and pricing calculations; tax calculations, customs duty calculations, land regulation calculations and license fee calculations; process chain evaluation steps in an automated production pipeline; and claims settlement calculations and agent commission calculations.

A "BRMS" or "Business Rule Management System" is a software system used to define, deploy, execute, monitor, and maintain the variety and complexity of decision logic that is used by operational systems within an organization or enterprise. This logic, which may be implemented in the form of business rules, includes policies, requirements, and conditional statements that are used to determine the tactical actions that take place in applications and systems. Most BRMS vendors have evolved from rule engine vendors to provide business-usable software development lifecycle solutions, based on declarative definitions of business rules executed in their own rule engine. However, some vendors come from a different approach (for example, they map decision trees or graphs to executable code). Rules in the repository are generally mapped to decision services that are naturally fully compliant with the latest SOA, Web Services, or other software architecture trends.

A BRMS typically includes: a repository, allowing decision logic to be externalized from core application code; tools, allowing both technical developers and business experts to define and manage decision logic; and a runtime environment, allowing applications to invoke decision logic managed within the BRMS and execute it using a business rules engine. Traditional BRMSs work in one of the following ways:

1. A BRMS acts as a single central rules system whereby the rules are built and maintained at the side of the applications running on the target systems. The applications have to call to the central rules system for executing the rules which manage which one of the services deployed to a particular target system should handle a service request. Said central rules system needs data replication from the single central system to the target systems so that rules are built based on the replicated data. The replicated data may comprise, for example, transactional data (e.g., claim records), master data (related to customers), and meta data (e.g., technical information for a field business partner, whereby the meta data may comprise an ID for a business partner stored in association with an output data value calculated for said customer. The data value may be stored, for example, in a database table in association with an ID of said customer. However, data may run out of sync and thus also the created rules may run out of sync with the original data. Interface coding from business application to central rules system needs to be established. This results in problems such as complexity, performance, security, and costs.
2. A first BRMS acts as a single central system where rules are built. Then the rules are copied into the target systems (application systems). On those target systems a complete further BRMS or a rules engine of a BRMS needs to be available for execution of the rules. Problems are again required data replication. And more important, the BRMS need to be installed and kept up to date on all application systems. This results in an increased time and effort that has to be spent on keeping the BRMS up to date. Mission critical application systems may therefore not be updated at all or only occasionally and may require a downtime for executing the update.

3. One BRMS instance is installed on each of the target managed systems. Rules are transported from a development landscape into each of the target managed systems, whereby the totality of target managed systems constitutes a productive landscape. This approach may be associated with an impossibility to use productive data unless said data is replicated into the development landscape; as mentioned above, this replication may cause downtimes and may thus negatively affect the updatability and maintainability of the overall system landscape.

Embodiments of the invention may provide a solution for the above mentioned problems: data may be directly used from the productive systems (target managed systems). Rules may be modeled and then be deployed into the productive landscape as generated code. No BRMS-artifacts are required on the target managed systems. Only a comparatively small program module, e.g., a plug-in installed in each of the target managed systems, is required to establish the communication to a central decision service manager. In case the target managed system is an ABAP system, said small program module may already be present on said ABAP system. According to embodiments, no full featured BRMSs, but only rules may be deployed in the form of rules service packages, e.g., with hot-deployment.

Some disadvantages of using a BRMS are that a BRMS typically is a complex software system which is installed at the side of the individual target managed systems. A BRMS usually does not provide a centralized instance for managing a plurality of managed systems. An operator trying to maintain a plurality of target managed systems by means of BRMSs may have to update and maintain a plurality of BRMSs and corresponding (often redundant) rule sets. This may require a considerable amount of time and effort. In a further disadvantageous aspect, updating a BRMS which manages a productive managed system often requires/results in a shutdown or temporary unavailability of the business logic of the managed system. This is particularly detrimental for business logic being at the core of a particular company, e.g., 24/7 services required to keep a production line operative. In a further disadvantageous aspect, maintaining a plurality of BRMSs located at the side of the managed systems may be complicated as said BRMSs may have different interfaces and may use different communication protocols for receiving remote calls (e.g., for updating rules in the BRMS).

Embodiments of the invention may avoid said disadvantages: a central management component, the decision service manager, may comprise and be in control of a central set of management rules for deploying decision services to a plurality of target systems and/or for updating decision services deployed to a plurality of target systems. Each target system may merely comprise a comparatively small module, e.g., a plug-in, instead of a full-featured RBPS. Said small module may not comprise any rules. It may merely comprise some program logic for receiving commands from the decision service manager, whereby the decision service manager may submit said commands in dependence on some centrally managed rules to said module. Thus, the updating of the rules which manage the deployment of decision services is facilitated (only the plug-in might need to be updated from time to time and the rules do not have to be deployed to the target systems).

A "decision service manager" is a centralized system management suite or a module thereof which controls the deployment of a plurality of decision services to a plurality of managed systems.

In one aspect, the invention relates to a computer-implemented method for deploying a decision service to a target managed system, the method comprising:

a decision service manager authenticating at a managed system hosting the decision service;

in case of a successful authentication at the managed system, the decision service manager sending a first status request to the managed system;

the decision service manager receiving, in response to the first status request, a first indication of a current status of the managed system;

the decision service manager authenticating at the target managed system;

in case of a successful authentication at the target managed system, the decision service manager sending a second status request to the target managed system;

the decision service manager receiving, in response to the second status request, a second indication of a current status of the target managed system;

the decision service manager performing a deployment readiness check, the check comprising comparing the first and the second indication;

in case the deployment readiness check returns as result that a current status of the target managed system allows the target managed system to host the decision service, automatically deploying the decision service to the target managed system.

Said features may be advantageous as a fully automated decision can be made whether a particular decision service being operative on a source managed system can also be deployed on another managed system. Thus, time and effort for maintaining the overall system is reduced. Further, the above deployment management approach may be particularly secure as the decision service management system has to authenticate itself at the target managed system before deploying a decision service.

For example, a decision service may be imported from a managed system to the decision service manager (DSM). Then said decision service may be changed on the DSM and deployed to another managed system. Alternatively, or in addition, a decision service may be built on the DSM de novo and be deployed to a managed system.

According to a further advantage the managed system does not need a business rule management (BRM) technology for building decision services as the features typically provided by a BRM are, according to embodiments, provided by the DSM in interoperation with a module, e.g., a plug-in, of each of the managed systems.

According to embodiments, the decision service manager outputs the second indication to a user of the decision service manager, e.g., via a graphical user interface. The second indication may specify resources being available at the target managed system, e.g., may specify database access data, information on database tables and table structures, on available network cards, available program libraries and the like. The second indication may also list all decision services and optionally also their versions which are currently deployed at the target managed system. The user may then modify the decision service or create a new decision service in accordance with the output first indication. Then, the decision service manager receives the new or modified decision service from the user, e.g., upon a deployment command of the user submitted via a graphical user interface. Alternatively, the user or the decision service manager may receive the editable source code or the executable code of said decision service from the managed system.

Said features may be advantageous as they enable a user to develop or modify a decision service without having to manually inspect the managed system in respect to other currently deployed decision services and in respect to resources available at the target managed system. Rather, all information being relevant for the operability of a particular decision service are returned, by the target managed system, automatically upon request. This may ease and accelerate decision service development and maintenance.

According to embodiments, a current status of a managed system comprises, in any combination, one or more of the following items: an indication of available hardware resources, e.g., processors, memory, storage, bus systems, device interfaces and the like, available databases, the structure of database tables of available databases, and of the decision services having already been deployed to the managed system.

According to embodiments, the decision service manager runs on a first server and the target managed system runs on a second server, the first and second servers being connected to each other via a network connection. Deploying decision services over a network takes considerable time for complex services and also produces network traffic. By executing a fully automated deployment readiness check using the first and the second indication as input, deploying a decision service to a system which does not support the required resources, which lacks other decision services on which the service to be deployed depends or which runs decision services which are incompatible to the service to be deployed can be avoided from the beginning, thereby reducing network traffic.

According to embodiments, deploying the decision service comprises transferring executable code and a service description file to the target managed system, wherein the executable code upon execution by the target managed system provides the deployed decision service. The service description file may comprise data being descriptive of said decision service and may also comprise administrative data, e.g., data on which user executed the deployment, the time and date of deployment, one or more tags indicating the reason or purpose of deployment or the mode of operation of the decision service (e.g., test mode or productive mode). The service description file may be, for example, an XML file.

The decision service manager may manage a plurality of managed systems including the first and the target managed systems. According to embodiments, any of the managed systems upon request returns content of the service description files of all decision services currently being deployed to said managed system as part of the response indicating a current status of said managed system.

According to embodiments, the authentication of the decision service manager at the managed system is based on providing a public key to the managed system and providing a private key to the decision service manager for enabling a later authentication. The public and the private key form an asymmetric cryptographic key pair. The decision service manager may sign a secret shared between the decision service manager and the managed system with his private key and send a signed data value to the managed system. The managed system may decrypt and thus evaluate a signature with its public key. The authentication at the target managed system is executed accordingly.

According to embodiments the method further comprises installing a business rule service package on the target managed system (e.g., as a plug-in), whereby the business rule service package comprises an interface and is adapted, after installation on the target managed system, to execute the following steps: receiving a service call from a client computer; extracting a service time from the service call or, if no service time can be extracted, using a current time as the service time; accessing a service catalog, the service catalog comprising a mapping of decision services currently deployed in the target managed system and respective service availability periods; calling, by the business rule service package, the requested decision service if its assigned availability period according to the mapping covers the service time; if the availability period assigned to the requested decision service does not cover the service time, the service request is not executed.

According to embodiments, in case the decision service requested depends or interacts with other decision services deployed on the target managed systems, the availability times assigned to said other decision services in the mapping are also required to cover the requested service time. Otherwise the service is not executed. According to some embodiments, at least some of the decision services are deployed to the target decision service in two or more different versions, each version having assigned a respective, availability period not overlapping with the availability periods of other versions of said decision service. The business rule service package is adapted to identify the version (if any) of the requested decision service covering the requested service time and selectively call said decision service version for processing the service request.

Said features allow for simulating and testing, without having to re- or un-deploy any decision service, how a particular managed system behaved at an arbitrary moment in the past, thereby easing the detection of errors or business process inconsistencies.

According to embodiments the deployment readiness check is based upon criteria (i.e., features) of the managed system, including the already deployed decision services, and the developed decision service to be deployed. The criteria include at least one of: that the decision service to be deployed to the target system does not depend on any resource not available in the target managed system; that the decision service to be deployed does not depend on any other decision service not already been deployed in the target managed system; or that the managed system responds to a request for availability by the decision service manager with an acknowledgement.

According to embodiments the method further comprises, after having deployed the decision service to the target system, locking objects in the target managed system being associated with the deployed decision service and locking the target managed system. For example, any other decision service having also been deployed to the target managed system from which the and from which the deployed decision service depends are locked, meaning that they cannot be un-deployed or replaced by another decision service. This may help to ensure service quality and service availability.

According to embodiments the inserting is executed while another decision service already having been deployed to the target managed system is in use.

According to embodiments each of the decision services has a unique identifier (ID). The inserting (i.e.: deploying) of a decision service into a target managed system may take place while another decision service having the same identifier is in use in the target managed system. It is even possible that two or more different versions of a particular decision service have the same identifier and have been deployed to the same target managed system. Each of said different versions have assigned, however, a respective validity period which does not overlap with the validity period of any one of the other decision service versions having the same service identifier. This feature may be advantageous as it is possible to seamlessly switch from a particular service version to another version at a particular moment in time with zero downtime of the service. It may also be possible to submit a request to a decision service whose validity period has already lapsed e.g., by adding a particular time of service as an argument to the service request. Thus, without having to deploy or undeploy a particular decision service version to or from the target managed system and without having to modify any code of the requesting client (the identifier and the name of the different decision service versions are the same), a particular decision service can be called and service results can be received as they would have been received in response to a call submitted at the specified time of service.

According to embodiments the inserted generated code has an as-of date, e.g., the beginning of a validity period, the as-of date indicating when the inserted generated code is permitted to execute on the managed system. This may be advantageous as the begin (and optionally also the end) of making a decision service available at a particular managed system can be determined in advance and fully automatically, thereby easing e.g., the seamless replacement of an outdated decision service version by a newer version.

According to embodiments, the target managed system comprises a mapping which assigns each deployed decision service or decision service version a respective validity period. Upon deploying the decision service to the target managed system, said mapping may be updated accordingly by a new mapping entry assigning the deployed decision service to its validity period.

The target managed system may, according to an embodiment, comprise an interface allowing one or more client systems, also referred herein as "customer systems," to request one or more methods of the deployed decision service. The arguments of each of said methods in said interface may consist of all method arguments of the callable method of the deployed decision service plus an additional argument for specifying a particular time and date. The target managed system may receive a call for a method of the deployed decision service from a customer system. The target managed system may evaluate the call for extracting the additional argument being indicative of a particular time and date. The target managed system may execute a lookup in the mapping for identifying one out of a plurality of decision services or decision service versions having been deployed to the target managed system and being mapped to a validity period covering the extracted time and date. Then, the target system may selectively call the identified decision service for providing the requested service to the calling customer computer. The call of the identified decision service may be executed by the target managed system with all method arguments received from the customer computer or at least with all method arguments except for the additional time argument. According to embodiments, all decision services currently being deployed to the target managed system are mapped to a period of validity. A method call comprising the additional time and date argument cannot trigger execution of a deployed service module whose validity period does not cover the specified time and date. Depending on the embodiment, a method call not comprising said additional argument may not be considered by the target managed system at all or may be treated as a method call whose additional argument is a current time and a current date when receiving the call from the customer computer. The interface may be provided to the managed system as a plug-in, e.g., a Java-plugin for Java based managed systems or an ABAP plug-in for ABAP based managed systems.

Said features may be advantageous as they may allow calling a target managed system with an additional time argument for testing how said system reacted at a particular moment in the past. For testing the behavior of a managed system potentially comprising a plurality of different decision services and decision service versions, it is not necessary to modify or reboot the managed system. It is enough to modify the time and date provided as an additional argument in each service call submitted from a customer's or system operator's computer. This eases the monitoring and testing of complex systems and allows to quickly reset the operation of the target managed system to an earlier point in time simply by modifying an argument of a service call.

According to embodiments the target managed system checks the mapping on a regular basis and automatically starts executing the deployed service in case it is determined that a validity period of said service module has begun and/or stops executing the deployed service in case it is determined that the validity period of said service module has ended. This may be advantageous as the operator can configure in advance when and which kind of decision service shall be enabled and disabled. This is particular advantageous for upgrading a 24/7 decision service to a newer version where it shall be ensured that the older version is seamlessly replaced by the newer version. Such a seamless update cannot be ensured by manual deployment regimes.

According to embodiments the computer-implemented method further comprises releasing the locks from objects associated with the decision service and the managed system.

The releasing may be executed automatically upon determining that a validity period of the deployed decision service has expired.

In a further aspect the invention relates to a distributed computer system comprising at least a first computer system hosting the decision service manager and/or one or more second computer systems, each second computer system respectively running one or more managed systems.

In a further aspect, a computer-implemented method includes creating a connection between a decision service manager and a managed system, establishing a signature of a decision service, developing, using at least one computer, the decision service based upon the established signature of the decision service, performing a deployment readiness check, transferring generated code implementing the decision service to the managed system upon a determination that the deployment readiness check was successful, inserting the generated code into the managed system, and retrieving a deployment status from the managed system.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

A second aspect, combinable with the general implementation, further comprising installing a business rule service package on the managed system.

In a third aspect, combinable with any of the previous aspects, the deployment readiness check is based upon criteria associated with the managed system and the developed decision service.

In a fourth aspect, combinable with any of the previous aspects, the criteria associated with the managed system and the developed decision service include at least one of that the definition and implementation of the decision service is free of any error messages, that defined limitations are not used within the decision service, the availability of the managed system, or that the managed system responds with an acknowledgement prior to performing the deployment.

A fifth aspect, combinable with any of the previous aspects, further comprising locking objects associated with the decision service to be deployed and locking the managed system.

In a sixth aspect, combinable with any of the previous aspects, the inserting takes place while another decision service is in use.

In a seventh aspect, combinable with any of the previous aspects, the inserted generated code has an as-of date indicating when the inserted generated code is permitted to execute on the managed system.

An eighth aspect, combinable with any of the previous aspects, further comprising generating a deployment log.

A ninth aspect, combinable with any of the previous aspects, further comprising releasing the locks from objects associated with the decision service to be deployed and the managed system.

In a further aspect, the invention relates to a computer-implemented method comprising: creating a connection between a decision service manager and a managed system; establishing a signature of a decision service; developing, using at least one computer, the decision service based upon the established signature of the decision service; performing a deployment readiness check; transferring generated code implementing the decision service to the managed system upon a determination that the deployment readiness check was successful; and inserting the generated code into the managed system.

According to embodiments the method further comprises installing a business rule service package on the managed system.

According to embodiments the deployment readiness check is based upon criteria associated with the managed system and the developed decision service. The criteria include at least one of: that the definition and implementation of the decision service is free of any error messages, that defined limitations are not used within the decision service, the availability of the managed system, or that the managed system responds with an acknowledgement prior to performing the deployment.

According to embodiments the method further comprises locking objects associated with the decision service and locking the managed system.

According to embodiments the inserting takes place while another decision service is in use.

According to embodiments the inserted generated code has an as-of date indicating when the inserted generated code is permitted to execute on the managed system.

According to embodiments the computer-implemented method further comprises releasing the locks from objects associated with the decision service and the managed system.

In a further aspect the invention relates to a computer-program product. The computer program product comprises computer-readable instructions embodied on tangible, non-transitory media. The instructions are operable when executed to perform operations to:
create a connection between a decision service manager and a managed system;
establish a signature of a decision service;
develop, using at least one computer, the decision service based upon the established signature of the decision service;
perform a deployment readiness check;
transfer generated code implementing the decision service to the managed system upon a determination that the deployment readiness check was successful; and
insert the generated code into the managed system.

According to embodiments the computer program product further comprises operations operable to install a business rule service package on the managed system.

According to embodiments the deployment readiness check is based upon criteria associated with the managed system and the developed decision service. The criteria include at least one of: that the definition and implementation of the decision service is free of any error messages, that defined limitations are not used within the decision service, the availability of the managed system, or that the managed system responds with an acknowledgement prior to performing the deployment.

According to embodiments the computer-program product further comprises operations operable to lock objects associated with the decision service and locking the managed system.

According to embodiments the inserting takes place while another decision service is in use.

According to embodiments the inserted generated code has an as-of date indicating when the inserted generated code is permitted to execute on the managed system.

According to embodiments the computer-program product further comprises operations operable to release the locks from objects associated with the decision service and the managed system.

In a further aspect the invention relates to a system comprising memory operable to store at least one decision service; and at least one hardware processor interoperably coupled to the memory. The processor is operable to execute a method according to any one of the above embodiments.

In a further aspect the invention relates to a computer-implemented method comprising:
installing a business rule service package on a managed system;
creating a connection between a decision service manager and a managed system;
establishing a signature of a decision service;
developing, using at least one computer, the decision service based upon the established signature of the decision service;
performing a deployment readiness check;
locking objects associated with the decision service and locking the managed system;
transferring generated code implementing the decision service to the managed system upon a determination that the deployment readiness check was successful;
inserting the generated code into the managed system;

releasing the locks from objects associated with the decision service and the managed system; and retrieving a deployment status from the managed system.

The subject matter described in this specification can be implemented in particular implementations so as to realize one or more of the following advantages. First, a decision services manager (DSM) server application can interface with a managed system to allow modeling with a business rules management (BRM) application of a decision service with all relevant data and development artifacts applicable to a business application on the managed system. This interfacing permits a local "feel" to the modeling of the decision service. Second, the modeled decision service is deployed to the managed system where the decision service is inserted into the managed system. The inserted decision service application programming interface may be configured to permit execution of the inserted decision service on the managed system according to an as-of date/time parameter. For example, the as-of date/time parameter, e.g., a validity period during which the deployed decision service shall be active, may indicate that the inserted decision service may execute immediately (e.g., when the current time is covered by the validity period of the decision service) or that the inserted decision service may not execute until a future date/time. This local and automated execution ensures higher performance for the decision service execution and protection of critical data by avoiding the introduction of delays and data exposure using a network. Third, computer systems do not need to be tightly coupled to a deployment source at a critical moment of deployment which increases overall system landscape robustness in case of a computer system failure. Fourth, a plug-in may be provided to the target managed system, whereby the plug-in manages the mapping between the one or more decision services deployed to the managed system and their respective validity periods and which provides an interface to the DSM application enabling the DSM application to interact with the managed system. The plug-in may be advantageous as it consumes very little resources on the managed system and is not disruptive to the operations of the managed system. The plug-in may also be provided for multiple platforms, e.g., ABAP or Java based application servers acting as managed systems, thereby increasing flexibility of the DSM application. Fifth, once a modeled decision service is deployed to a managed system, the DSM application is no longer needed to execute the deployed decision service. This increases robustness of the overall system. Sixth, the DSM application may be used with managed test systems to provide manual or automated test functionality. For example, the calls from one or more customer computers may comprise an additional argument indicating that the call is submitted for test purposes only. Alternatively, a plug-in of the managed system may receive a request from a customer and may automatically add the 'test' argument or treat the call as a test call. Thus, said plug-in may call the deployed decision service in a test mode, thereby prohibiting an intermixing of test calls and generated test data with productive calls and generated productive data. Seventh, the managed system contains a complete description of the deployed decision service allowing multiple DSM applications interfaced with the managed system to load and maintain the deployed decision service in an automated manner: the complete description of a source managed system where a particular decision service was deployed and run successfully the first time may be automatically compared with a complete and automatically generated description of one or more target systems for executing a deployment readiness check. Eighth, the decision service may be executed on a DSM server for testing purposes, whereby data generated in a testing mode by the deployed decision service is strictly separated from productive data generated by the same deployed decision service in the same target managed system. This protects the system from data inconsistencies. Further, a modeled decision service may be deployed to multiple managed systems at the same time, deployed decision services may have an as-of date indicating when the deployed decision service is permitted to execute, and decision services executing on a managed system can generate execution traces that may be imported into the DSM application for trace visualization or analytics. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3A illustrates an example graphical user interface screenshot from a DSM application showing managed systems available to the DSM application.

FIG. 3C illustrates an example graphical user interface screenshot from a DSM application showing information regarding deployment information of various decision services on a selected managed system.

FIG. 4 is a block diagram illustrating a managed system.

FIG. 5 is a block diagram illustrating a client.

Like reference numbers and designations in the various drawings indicate like elements.

DETAILED DESCRIPTION

The disclosure generally describes computer-implemented methods, software, and systems for modeling and deploying decision services.

Figure 1:
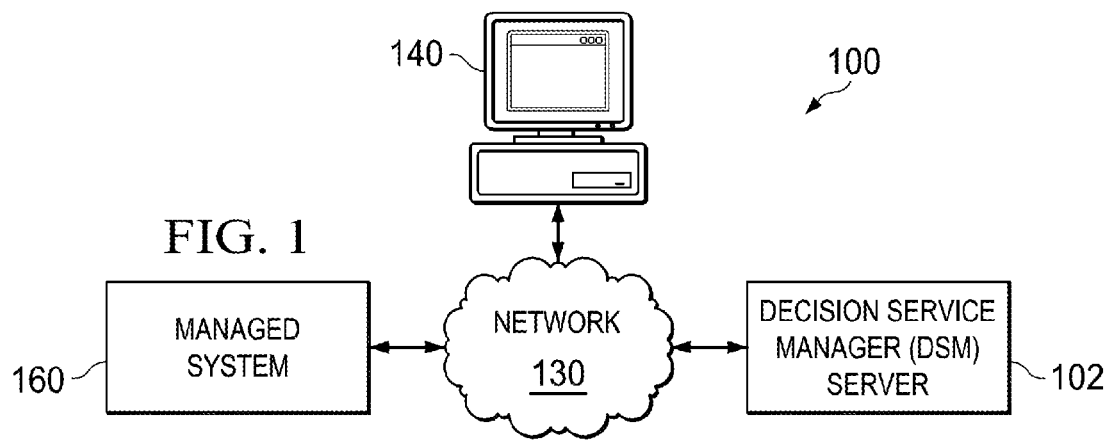
FIG. 1 is a block diagram illustrating an example system for modeling and deploying decision services.

FIG. 1 illustrates an example distributed computing system 100 operable to model and deploy decision services. Specifically, the illustrated example distributed computing system 100 includes or is communicably coupled with a decision service manager (DSM) server 102, a client 140, and a managed system 160 that communicate across a network 130. At a high level, the DSM server 102 allows building, modification, and deployment of decision services to the managed system 160 in an organization's managed system landscape.

Generally, through a graphical user interface (GUI), a DSM server 102 user, for example a client 140, is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Figure 2:
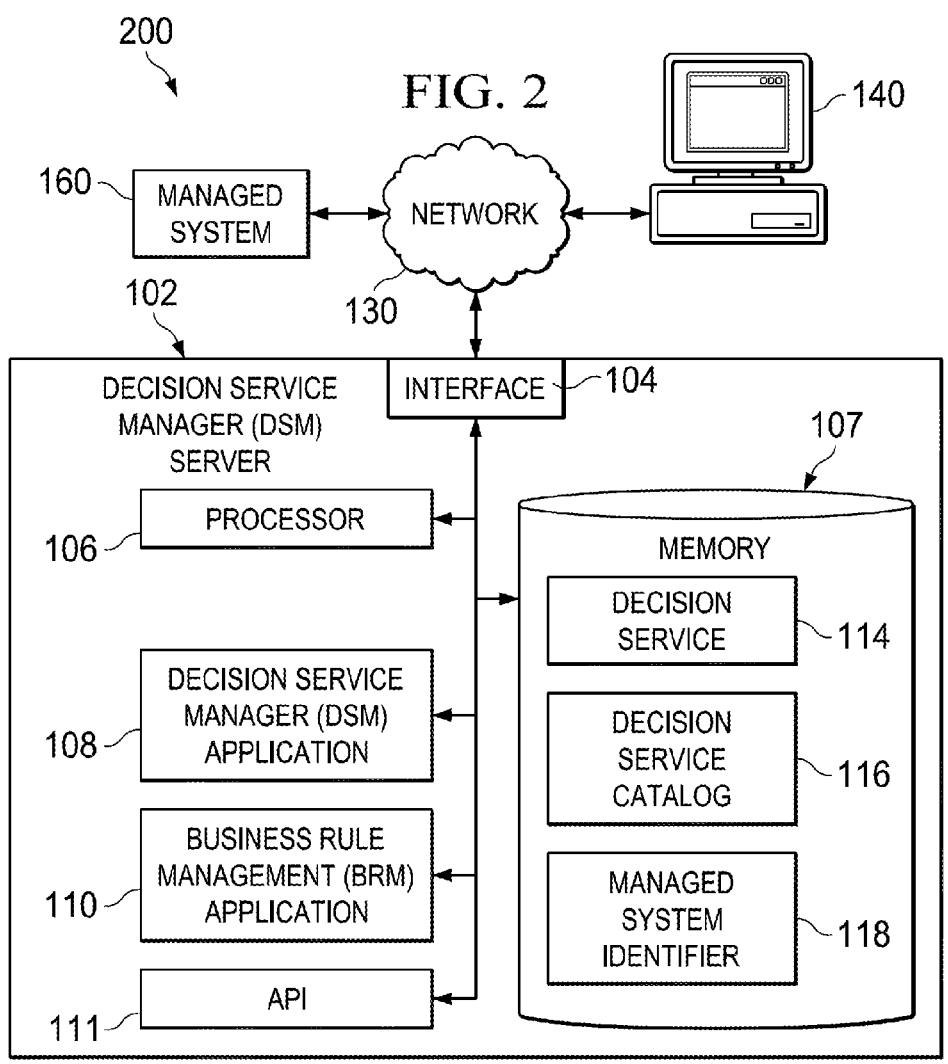
FIG. 2 is a block diagram illustrating a decision service manager (DSM) server.

Turning now to FIG. 2, FIG. 2 is a block diagram 200 illustrating a decision service manager (DSM) server 102. At a high level, the DSM server 102 comprises an electronic computing device operable to receive, transmit, process, store, or manage data and information associated with the example distributed computing system 100. In general, the DSM server 102 is a server that stores a DSM application 108 and a business rule management (BRM) application 110, where at least a portion of the DSM application 108 and/or the BRM application 110 is executed using requests and responses sent to a client 140 within and communicably coupled to the illustrated example distributed computing system 100 using network 130. The DSM application 108 and/or BRM application 110 are used to identify and communicate with one or more managed systems 160 and to build, modify, and deploy decision services to the one or more managed systems 160 in the organization's managed system landscape. In some implementations, the DSM server 102 may store a plurality of various DSM applications 108 and/or BRM applications 110. In other implementations, the DSM server 102 may be a dedicated server meant to store and execute only a single DSM application 108 and/or a BRM application 110. In some implementations, the DSM server 102 may comprise a web server, where the DSM application 108 and/or the BRM application 110 represents one or more web-based applications accessed and executed by the client 140 using the network 130 or directly at the DSM server 102 to perform the programmed tasks or operations of the DSM application 108 and/or the BRM application 110.

Specifically, the DSM server 102 is responsible for receiving application requests, for example decision service modification requests, from one or more client applications associated with the client 140 of the example distributed computing system 100 and responding to the received requests by processing said requests in the associated DSM application 108 and/or BRM application 110, and sending an appropriate response from the DSM application 108 and/or BRM application 110 back to the requesting client application. In addition to requests from the client 140, requests associated with the DSM application 108 and/or BRM application 110 may also be sent from internal users, external or third-party customers, other automated applications, as well as any other appropriate entities, individuals, systems, or computers. According to one implementation, DSM server 102 may also include or be communicably coupled with an e-mail server, a web server, a caching server, a streaming data server, and/or other suitable server. In other implementations, the DSM server 102 and related functionality may be provided in a cloud-computing environment.

The DSM server 102 also includes an interface 104, a processor 106, and a memory 107. The interface 104 is used by the DSM server 102 for communicating with other systems in a distributed environment—including within the example distributed computing system 100—connected to the network 130; for example, the client 140 and the managed system 160, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the DSM server 102 includes a processor 106. Although illustrated as a single processor 106 in FIG. 1, two or more processors may be used according to particular needs, desires, or particular implementations of the example distributed computing system 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the DSM server 102. Specifically, the processor 106 executes the functionality required to receive and respond to requests from the client 140 and/or model and deploy decision services.

The DSM server 102 also includes a memory 107, or multiple memories 107. The memory 107 may include any type of memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto associated with the purposes of the DSM server 102.

Additionally, the memory 107 may include any other appropriate data, such as VPN applications, firmware logs and policies, firewall policies, a security or access log, print or other reporting files, as well as others. While memory 107 is illustrated as an integral component of the DSM server 102, in alternative implementations, memory 107 can be external to the DSM server 102 and/or the example distributed computing system 100.

The memory 107 holds data for the DSM server 102. In some implementations, the memory 107 includes a decision service 114, a decision service catalog 116, and a managed system identifier 118. Although illustrated as single instances, there may be more than one instance of the decision service 114, the decision service catalog 116, and the managed system identifier 118.

The decision service 114 is one or more of a programmatic task, function, algorithm, instruction, macro, rule set, etc. (i.e. rule) to be executed using a defined set of inputs (the context for the decision service 114) and outputs (the result of the decision service 114). The set of inputs are used by the decision service rule(s) to derive or calculate the values of one or several other attributes. The term "decision service," as used herein, relates to any piece of program logic which can be called via at least one interface method and returns one or more data values as result. Decision services are often related to validations, derivations, defaulting, classification, calculation, mapping, and Boolean decisions. Often a decision service 114 represents a micro decision, those that occur very frequently and can impact the efficiency of an organization's operations. For example, a decision service 114 may process a received financial data set as inputs, perform a tax calculation for a purchase order associated with a particular country, and then output the result. A decision service is often associated with a particular business process step to perform one or more tasks at the particular business process step. The decision service may include a description of the decision service including the definition of the inputs and outputs of the decision service, e.g., a description of the interface method signature, in particular arguments and argument types of the method. In some implementations, the program module implementing the decision service 114 and/or an identifier of said module can be stored within a decision service catalog 116, a collection of decision services 114. In some implementations, the description of a particular decision service 114 is in the form of individual text modules that may be assembled to form a complete description of the particular decision service 114. In some implementations, the decision service catalog 116 can be subdivided into different decision service 114 service types, for example, tax calculators, loan interest calculators, etc.

The BRM application 110 is a decision service 114 development engine providing a comprehensive API and GUI for defining, editing, testing, maintaining, and processing decision services 114 and associated decision services 114 rules. The BRM application 110 allows decision services 114 to be modeled in an intuitive manner, fosters reuse, and supports simulation, tracing, transport, and Extensible Markup Language (XML) export and import of decision services 114. In some implementations, the BRM application 110 is capable of modeling decision service rules that are capable of, for example, using decision tables and trees, reading data during the modeled rule execution, performing database calls/functions, calling services or interfaces in multiple computing languages and/or protocols, and other suitable rule-based functions. For example, a modeled decision service executing on a managed system may perform database updates on a legacy database system using a customer-supplied custom software adaptor to interface the legacy database system with the managed system to transfer the legacy database information to a modern database system. In some implementations, the BRM application 110 is web-based and runs in a client 140 browser window. In some implementations, the BRM application 110 may be partially or completely provided in a cloud-computing environment.

The DSM application 108 provides functionality that is additive to that of the BRM application 110. For example, the DSM application provides a set of capabilities for the administration of managed systems 160, including: 1) decision service deployment into one or multiple managed systems; 2) "as-of" deployment of decision services (i.e., the decision services become active "as-of" a specified time but may be deployed to the respective target managed systems earlier); 3) recovery of system information from managed systems, e.g., for executing deployment readiness checks; 4) retention and production of information concerning prior and planned deployments of decision services; 5) importation of saved traces from local execution of decision services on managed systems; 6) importation of XML describing local decision services on source and target managed systems; a source managed system in respect to a particular decision service is a managed system on which a particular decision service was already executed successfully and from which the decision service is to be retrieved for deploying a copy of said decision service to a target managed system (if feasible given the configuration and currently deployed decision services of the target managed system); 7) importation of XML describing already deployed decision services, e.g., business applications, and/or resources (databases, database tables, network connections, etc.) available on managed systems; 8) importation and download of generated decision service classes as a file from managed systems acting as source managed systems; 9) deletion of deployments (prior and planned) in managed systems; 10) deletion of historic decision services (including XML, generated classes, and traces) from managed systems; and 11) performance of deployment tests on managed systems, whereby data generated by the tests is separated from data generated during production. Said steps may be executed fully automatically. As will be apparent to those skilled in the art, other appropriate capabilities consistent with these examples may also be provided. In some implementations, the BRM application 110 is modified to tightly integrate with the DSM application 108 in order to provide DSM server 102 users a seamless development environment for decision services 114 and applicable administration of managed systems 160 with respect to the decision services 114.

Remote function call (RFC) is a protocol for remote communication between computers. An RFC destination defines all communication attributes to connect to a remote computer, such as unique computer name, the physical address of the computer, encryption protocols, passwords, etc. In some implementations, the identification of each managed system 160 by the DSM application 108 is provided by an RFC destination (i.e., a managed system identifier 118). For example, a managed system identifier 118 for a particular managed system 160 may be described as: "Name=FI_EMEA, Description=Financials in Europe, RFC_Destination=UIX_080." Of course, as will be appreciated by those skilled in the art, other data fields, values, etc. may be used as long as the managed system can be uniquely identified by the DSM server 102. Turning now to FIG. 3A, FIG. 3A illustrates an example GUI screenshot 300*a* from the DSM Application 108. Available managed systems to the DSM Application 108 are shown at 302. At 304, the example system described by the example managed system identifier 118 above (i.e., Name=FI_EMEA) is listed as a selected available managed system to the DSM Application 108. Additional technical information is available to the DSM application 108 user for the selected available managed system 304 on a "Technical Information" tab 306. In some implementations of the DSM application 108, attributes of each listed managed system in 304 may be maintained. In other implementations of the DSM application 108, grouping of available managed system, such as in a hierarchical structure, sub-menus, etc., is available. In other implementations, other suitable protocols apart from RFC may be used without departing from the scope of the disclosure.

Figure 3B:
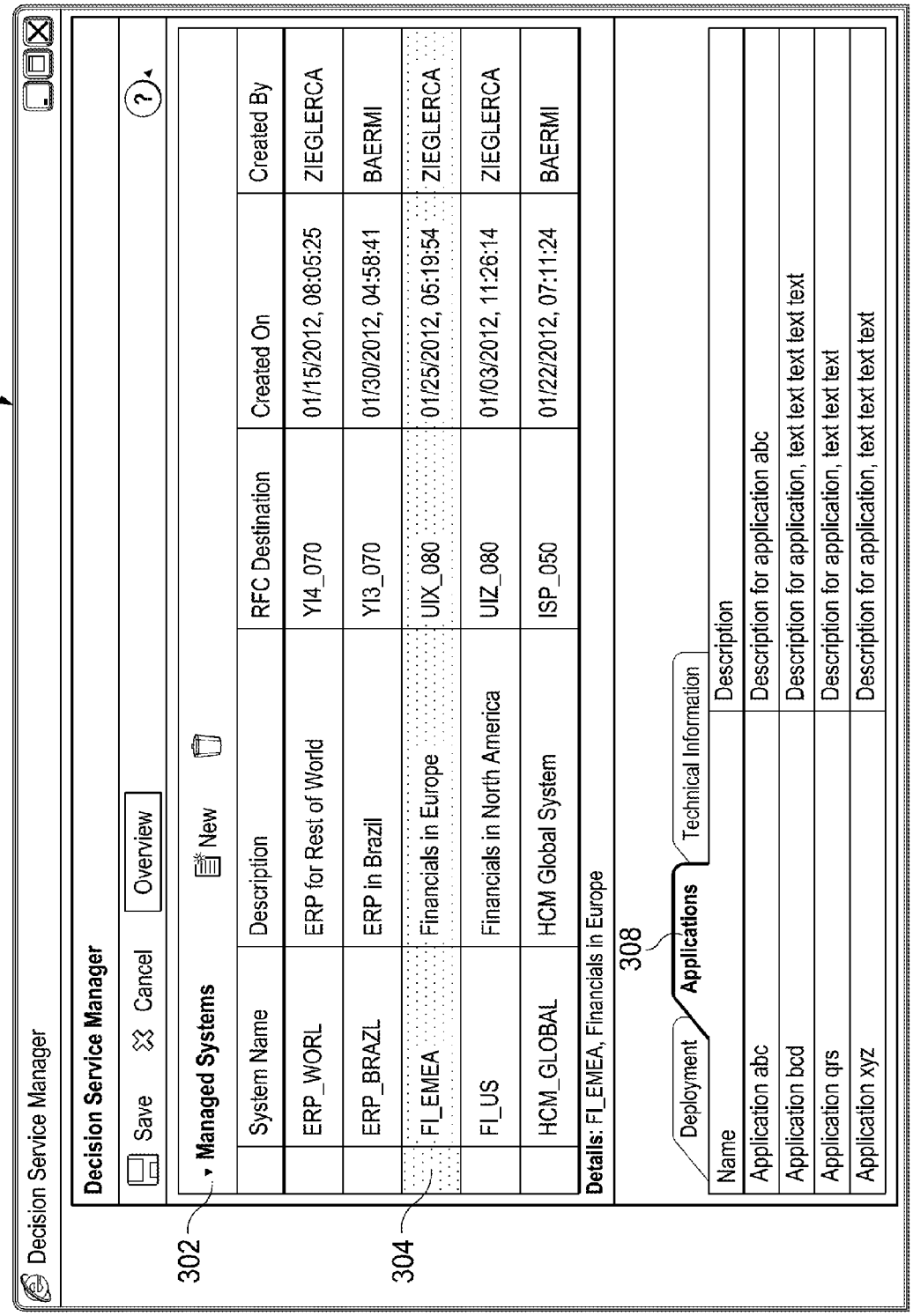
FIG. 3B illustrates an example graphical user interface screenshot from a DSM application showing information regarding business applications available on a selected managed system.

Turning now to FIG. 3B, FIG. 3B illustrates an example graphical user interface screenshot 300*b* from a DSM application 108 showing information regarding business applications available on a selected managed system 304. At 308, a list of business applications (described below) available on example selected managed system 304 is shown. While the illustrated example screenshot 300*b* only shows "Name" and "Description" attributes associated with the listed example applications at 308, other appropriate attributes, such as business application permissions, status, execution time, etc. may also be presented or made available to the DSM application 108 user. In some implementations of the DSM application 108, the manual assignment of some or all business applications available on a managed system is possible.

Turning now to FIG. 3C, FIG. 3C illustrates an example graphical user interface screenshot 300c from a DSM application 108 showing information regarding deployment information of various decision services on a selected managed system 304. At 308, a list of decision services associated with selected managed system 304 are shown. For example, at 310 for decision service "SERV B", various columns of information 312 are available relating to the decision service 310. Here a DSM application 108 user can obtain historical or planned deployment information such as deployment timestamp, source system information, valid from/valid to information, available trace information, and decision service generation status. At 312, additional commands are available, such as deploy and deployment readiness check. In some implementations of the DSM application 108, the grouping/selection of multiple decision services for deployment to one or more managed systems 160 is possible. It should be appreciated that FIGS. 3A-3C are only representative examples of the GUI interface available through the DSM application 108 and are not meant to limit in any way appropriate functionality or information that may be made available to a DSM application 108 user.

The DSM server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the DSM application 108 and/or one or more components of the DSM server 102 or other components of the example distributed computing system 100, both hardware and software. For example, in one implementation, the DSM application 108 can utilize API 111 to communicate with a managed system 160.

Turning now to FIG. 4, FIG. 4 is a block diagram 400 illustrating a managed system 160. The managed system 160 may be any computing device operable to connect to or communicate with the DSM server 102 using the network 130. In general, the managed system 160 comprises an electronic computer device operable to receive, transmit, process, and store any appropriate data associated with the example distributed computing system 100.

Specifically, the managed system 160 acts as a client to a DSM server 102 and receives calls from the DSM server 102. For example, a received call may be for the deployment of a new decision service 114 on the managed system 160. In some implementations, the received call may be a remote function call (RFC), but communication using any suitable interface, protocol or communication method is envisioned, as appropriate, between the DSM server 102 and the managed system 160 without departing from the scope of this disclosure. Example managed systems 160 may include, but are not limited to, enterprise resource planning (ERP) systems and customer relationship management (CRM) systems.

The illustrated managed system 160 includes an interface 162, a processor 164, an API 168, a function module 170, and a memory 174. The interface 162 is used by the managed system 160 for communicating with other systems in a distributed environment—including within the example distributed computing system 100—connected to the network 130; for example, the DSM server 102, as well as other systems communicably coupled to the network 130 (not illustrated). The interface 162 may be consistent with the above-described interface 104 of the DSM server 102 or other interfaces within the example distributed computing system 100. The processor 164 may be consistent with the above-described processor 106 of the DSM server 102 or other processors within the example distributed computing system 100. Specifically, the processor 164 executes instructions and manipulates data to perform the operations of the managed system 160, including the functionality required to receive requests from the DSM server 102, process responses to the DSM server 102, execute the business application, and/or logic associated with the plug-in.

The business application 166 is any type of application that allows the client 140 to request and view content on the client 140. In some implementations, the business application 166 can be and/or include a web browser. In some implementations, the business application 166 can use decision services 114, parameters, metadata, and other information received prior to launch to perform tasks associated with the managed system 160 or other components communicably coupled with managed system 160. Once a particular business application 166 is launched, a client 140 may interactively process a task, event, or other information associated with the managed system 160. The business application 144 can also be any application, program, module, process, or other software that may execute, change, delete, generate, or otherwise manage information associated with a particular managed system 160, and in some cases, a business process performing and executing business process-related events. In particular, business processes communicate with other clients 140, applications, systems, and components to send and receive events. Additionally, a particular business application 166 may operate in response to and in connection with at least one request received from other business applications 166, including a business application 166 associated with another managed system 160. In some implementations, each business application 166 can represent a Web-based application accessed and executed by remote clients 140 using the network 130 (e.g., through the Internet, or using at least one cloud-based service associated with the business application 166). For example, a portion of a particular business application 166 may be a Web service associated with the business application 166 that is remotely called, while another portion of the business application 166 may be an interface object or agent bundled for processing at a remote client 140. Moreover, any or all of a particular business application 166 may be a child or sub-module of another software module or enterprise application (not illustrated) without departing from the scope of this disclosure. Still further, portions of the particular business application 166 may be executed or accessed by a user working directly at the managed system 160, as well as remotely at a corresponding client 140. In some implementations, the DSM server 102 can execute the business application 166. Further, although illustrated as a single business application 166, the business application 166 may be implemented as multiple business applications in the managed system 160.

The managed system 160 further includes an application programming interface (API) 168. The API 168 may be consistent with the above-described API 111 of the DSM server 102 or other API's within the example distributed computing system 100. Specifically, API 168 provides an interface for the remote trigger of an execution of a decision service on the managed system 160 by the DSM server 102, client 140.

The illustrated managed system 160 also includes a memory 172, or multiple memories 172 that may be consistent with the above-described memory 107 of the DSM server 102 or other memories within the example distributed computing system 100 but storing objects and/or data associated with the purposes of the managed system 160. The memory 172 holds data for the managed system 160. In some implementations, the memory 172 includes business application data 174, a data dictionary 176, a decision service 178, a decision service catalog 180, and business rule service package components 182. Although illustrated as single instances, there may be more than one instance of the business application data 174, the data dictionary 176, the decision service 178, the decision service catalog 180, and the business rule service package components 182. The decision service 178 and the decision service catalog 180 associated with memory 172 may be consistent with the above-mentioned descriptions of the decision service 114 and/ or the decision service catalog 116 associated with the memory 107 of the DSM server 102. Specifically, the decision service 178 provides decision service functionality to the managed system 160. On the managed system 160, the decision service catalog 180 provides a list of decision services deployed from the DSM server 102 to the managed system 160. The catalog may also comprise a mapping of identifiers of the currently deployed decision services with respective periods of validity. Said periods of validity may be received by a managed system from the DSM server upon deployment of said decision service. For example, the period of validity may be specified in an XML file deployed together with the executables of said decision service, and may be extracted by a plug-in of the managed system for automatically updating the catalog.

The business application data 174 is any type of data associated with a data object used by a business application. For example, for a business application that processes sales invoices, business application data for a specific sales invoice data object may include data pertaining to a particular sales invoice number, buyer, seller, date, address, product(s), quantity, price, tax rate, etc.

The data dictionary 176 is a central, non-redundant, logical description/definition of all data objects used within the managed system 160. Example data objects stored within the data dictionary 176 includes database tables, views, types, domains, search helps, and lock objects. For example, the data dictionary 176 shows how the data objects are mapped to an underlying relational database in tables or views which store business application data 174. New or modified data objects within the data dictionary 176 are available to all components associated with the managed system 160. The data dictionary or parts thereof may describe resources available at a particular target managed system. The data dictionary or parts thereof may be automatically returned to the DSM by a target managed system in response to receiving a request from the DSM for deploying a further decision service to the target managed system. The data dictionary 176 also provides standard editing functions for editing data objects within the data dictionary 176.

The business rule service package components 182 are created by the installation of a business rule service package (not illustrated) providing necessary support components to allow a system to act as a managed system 160. In some implementations, an installed business rule service package 180, implemented e.g., as plugin of the managed system, adds components to the managed system 160 including a function group and a function module 170 for communication with the DSM server 102, database tables for persistence to save, for example, generated class names, traces, and Extensible Markup Language (XML) descriptions of decision services, the API 168 (described above) for decision service invocation by the DSM server 102, and helper classes for use by the function module 170 and the API 168.

The function module 170 interfaces with the business application 166 and/or memory 172 and permits communication between the managed system 160 and the DSM server 102. In some implementations, communication between the managed system 160 and the DSM server 102 occurs only from the DSM 102 to the managed system 160. In other implementations, communication between the managed system 160 and the DSM server 102 may be bi-directional. Through the function module, the DSM server 102 has visibility to business applications 166 and business artifacts stored on memory 172 (e.g., business application data 174, data dictionary 176, etc.). The BRM application 110 may then be used in conjunction with the DSM application 108 to develop and/or maintain decision services associated with the managed system using the actual business artifacts from the managed system 160. For example, a function module 170 may be called by the DSM application 108 to deploy a decision service to the managed system. The function module 170 would receive the decision service description to deploy from the DSM server 102 and insert the decision service code into the managed system 170. In another example, the DSM application 108 uses a function module 170 on the managed system 160 to retrieve data values from the managed system 160 at design time of a decision service. In this example, the value of an Employee data field may be requested by the DSM application 108 from the function module for use in the BRM application 110, The function module 170 would then return the requested Employee data from the managed system 160. In some implementations, the DSM application 108 can retrieve data from multiple managed systems 160.

The helper classes in the business rule service package of the target managed system verify and report whether a transferred decision service 114 can be executed on the target managed system 160. The helper classes also optimize the transferred decision service 114 when inserted into the managed system 160 as a local decision service 178 and update the decision service catalog 180 to reflect the successful deployment and insertion of the decision service 178.

While the API 168 and the function module 170 are illustrated as separate modules, the above-described function group, database tables, XML, and helper classes are collectively shown within memory 172 as the business rule service package components 182. However, these components could be implemented and/or illustrated as stand-alone modules without departing from the scope of this disclosure. In some implementations, it is possible to install both a DSM application 108 and a business rule service package onto a managed system. In this implementation, the managed system 160 will act as both a server and a client for remote decision service code generation and/or deployment. If a business rule service package and a DSM application are installed on a managed system 160, those skilled in the art will appreciate that various components illustrated in FIG. 2 may also be incorporated into the managed system to support DSM application 108 functionality, for example, the decision service catalog 116 or the managed system identifier 116. In some implementations, the DSM application 108 will verify the availability of the components installed by the business rule service package. In some implementations, this verification can be performed by verifying the actual components installed by the business rule service package and/or through a flag, empty file, registry entry, or other suitable installation indicator.

There may be any number of managed systems 160 associated with, or external to, the example distributed computing system 100. For example, while the illustrated example distributed computing system 100 includes one managed system 160, alternative implementations of the example distributed computing system 100 may include multiple managed systems 160 communicably coupled to the DSM server 102 and/or the network 130, or any other number suitable to the purposes of the example distributed computing system 100. Additionally, there may also be one or more additional managed systems 160 external to the illustrated portion of the example distributed computing system 100 that are capable of interacting with the example distributed computing system 100 using the network 130.

Turning now to FIG. 5, FIG. 5 is a block diagram 500 illustrating a client 140. The client 140 may be any computing device operable to connect to or communicate with at least the DSM server 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the DSM server 102 and/or managed system 160, as well as other systems communicably coupled to the network 130 (not illustrated). The interface 152 may also be consistent with the above-described interface 104 of the DSM server 102, the interface 162 of the managed system 160, or other interfaces within the example distributed computing system 100. The processor 144 may be consistent with the above-described processor 106 of the DSM server 102, the processor 164 of the managed system 160, or other processors within the example distributed computing system 100. Specifically, the processor 144 executes instructions and manipulates data to perform the operations of the client 140, including the functionality required to send requests for a particular, function, e.g., a decision by a decision service, to the DSM server 102 and/or managed system 160 and to receive and process responses from the decision service via the DSM server 102 and/or via the managed system 160. The memory 148 may be consistent with the above-described memory 107 of the DSM server 102, the memory 172 of managed system 160, or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the DSM server 102 and/or the managed system 160.

There may be any number of clients 140 associated with, or external to, the example distributed computing system 100. For example, while the illustrated example distributed computing system 100 includes one client 140, alternative implementations of the example distributed computing system 100 may include multiple clients 140 communicably coupled to the DSM server 102, managed system 160, and/or the network 130, or any other number suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the DSM server 102, managed system 160, or the client 140 itself, including digital data, visual information, or a GUI 142, as shown with respect to the client 140.

Figure 6:
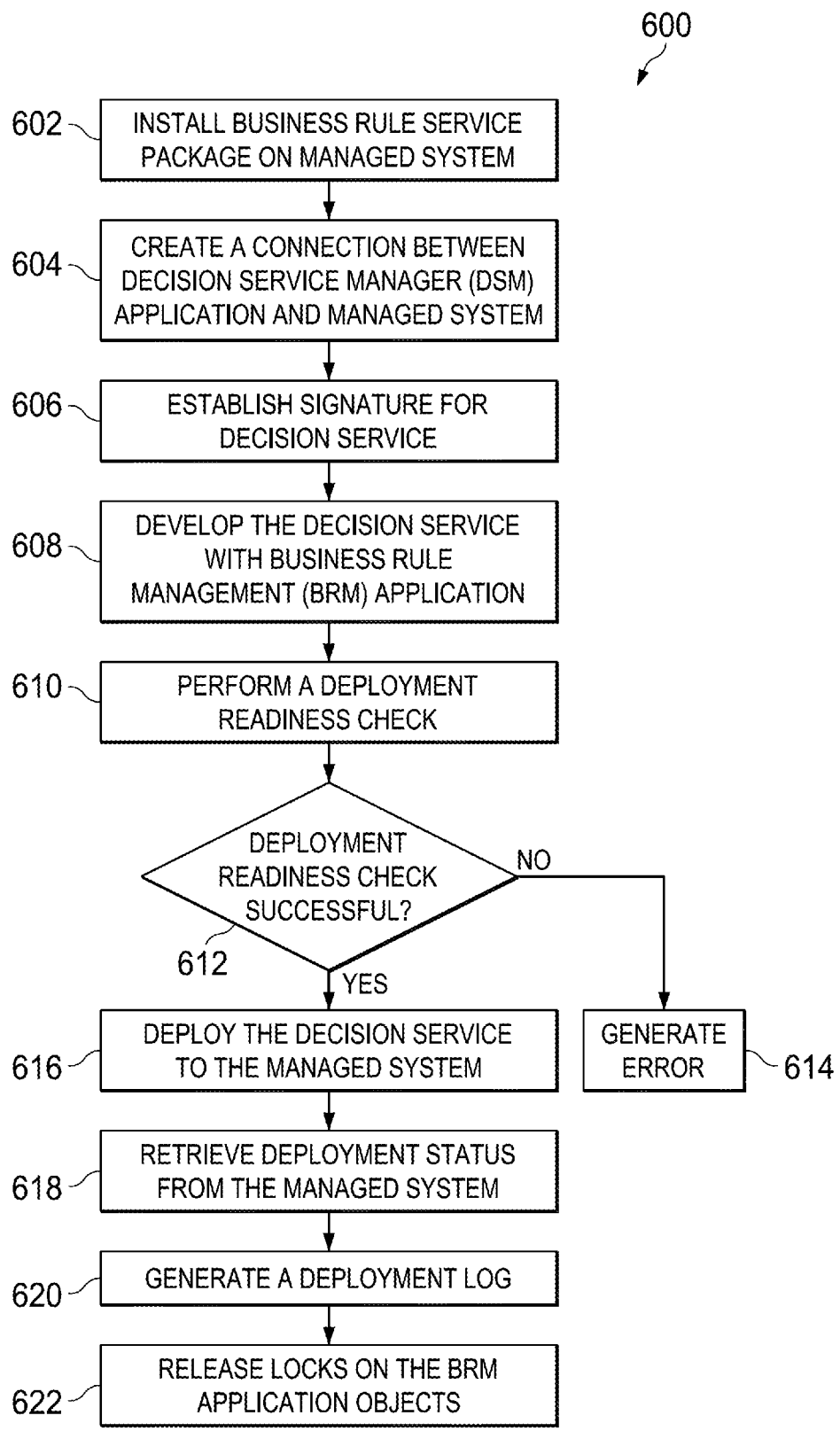
FIG. 6 is a flow chart for modeling of a decision service and preparation for deployment to a managed system.

Turning now to FIG. 6, FIG. 6 is a flow chart 600 for modeling a decision service and preparation for deployment to a managed system. For clarity of presentation, the description that follows generally describes method 600 in the context of FIGS. 1, 2, 4, and 5. However, it will be understood that method 600 may be performed, for example, by any other suitable system, environment, software, and hardware, or a combination of systems, environments, software, and hardware as appropriate. For example, one or more of the business suite server, the client, or other computing device (not illustrated) can be used to execute method 600 and obtain any data from the memory of the client, the business suite server, or the other computing device (not illustrated).

At 602, a business rule service package is installed on a system to convert the system to a managed system. From 602, method 600 proceeds to 604.

At 604, a connection is created between the decision service manager (DSM) application and the managed system. In some implementations, a DSM application user will enter unique identification information into the DSM application GUI and select the entered managed system to establish the connection. From 604, method 600 proceeds to 606.

At 606, a signature for a decision service is established in the BRM application. The BRM application user may either retrieve a signature of an existing decision service on the DSM server or the managed system. If the decision service signature is retrieved from the managed system, in some implementations, the managed system returns XML defining the signature to the DSM application for use by the BRM application. The BRM application user may also define a new signature for a decision service using the BRM application. From 606, method 600 proceeds to 608.

At 608, a decision service is generated with the BRM application using the established decision service interface. The BRM application user may also use actual data from the managed system in order to develop, edit, and/or test the newly generated decision service. From 608, method 600 proceeds to 610.

At 610, a deployment readiness check is performed. Note, a deployment may be performed either online or offline. An online deployment refers to user interaction where the user starts the deployment and waits for a returned status message/result. An offline deployment refers to the user starting the deployment and revisiting the DSM application at a later time to determine the status of the deployment. A decision service can be deployed into a managed system when at least 1) the definition and implementation of the decision service is free of any error messages; and 2) concepts defined as limitations are not used within the decision service. For example, a defined limitation may include that action types or custom expression types are not supported in a decision service to be deployed to a managed system. Additional checks performed may include availability of the managed system (e.g., using RFC Ping), that all relevant packages have been generated by the BRM application, and that the managed system response with an acknowledgment that a deployment is OK. From 610, method 600 proceeds to 612.

At 612, a determination is made whether the performed readiness check returned a successful result. If at 612, it is determined that the performed readiness check did not return a successful result, method 600 proceeds to 614 where an error is generated. In some implementations, the error can be displayed on a GUI. In other implementations the error can also be transmitted using email or some other messaging method to a designated user and/or system to be further processed. If at 612, however, it is determined that that the performed readiness check did return a successful result, method 600 proceeds to 616.

Figure 7:
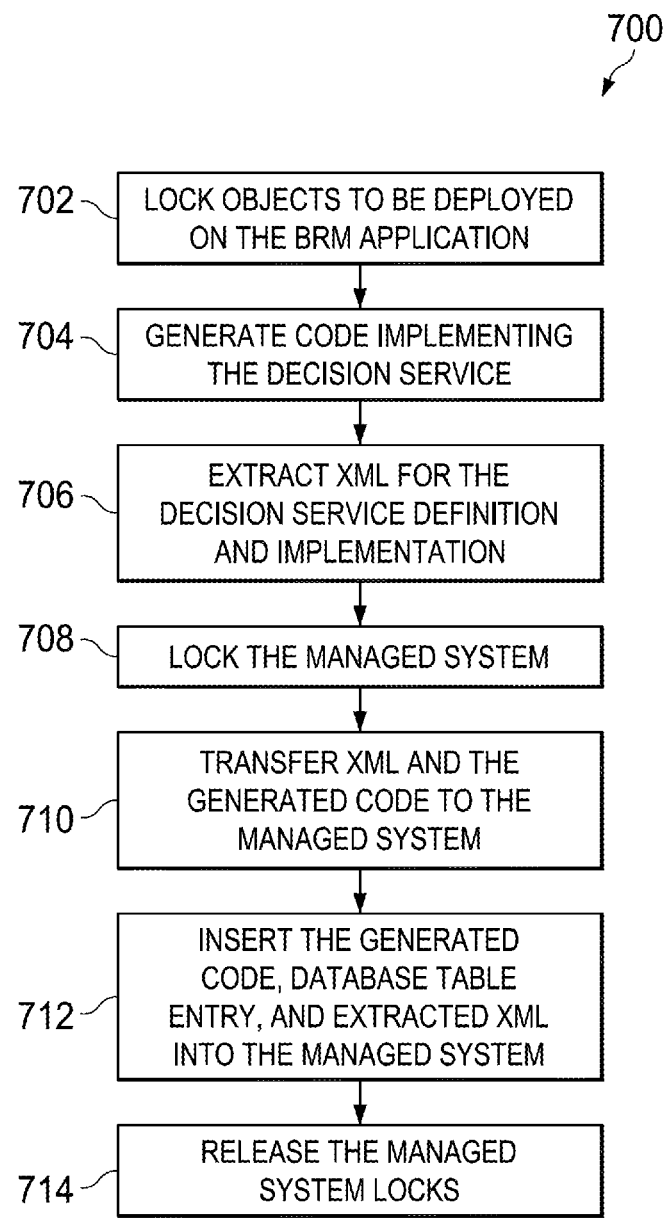
FIG. 7 is a flow chart for deploying a modeled decision service to a managed system.

At 616, the generated decision service is deployed on the managed system using the DSM application (further illustrated in FIG. 7). From 616, method 600 proceeds to 618.

At 618, the deployment status is retrieved by the DSM application from the managed system. From 618, method 600 proceeds to 620.

At 620, a deployment log is generated. From 620, method 600 proceeds to 622.

At 622, the locks on the BRM application objects are released. After 622, method 600 stops.

Although FIG. 6 illustrates the interaction between a single decision service manager (DSM) server and/or DSM application and a single managed system, it is possible for a DSM server and/or application to interface with multiple managed systems to, for example, request data from the multiple managed systems during a design-time modeling of a decision service. A single DSM application may also, for example, deploy (as further described in FIG. 7 below) a developed decision service to multiple managed systems. Similarly, multiple DSM applications may interface with a single managed system. Each DSM application import the XML descriptions of all deployed managed-system-specific decision services and may assist in the maintenance of the imported decision services on the managed system.

Further, in some implementations, a decision service may be in use by a managed system while an updated version of the decision service in use is deployed to the same managed system(s). In these implementations, the deployed updated decision service can have an as-of date/time parameter established. After the established as-of date/time has passed, any request to use the decision service will result in the use of the updated decision service. In other implementations, the newly deployed decision service may begin to be used immediately following successful deployment. The ability to deploy a new/updated decision service concurrently while another is in use avoids system downtime to perform decision service deployments and/or updates.

Turning now to FIG. 7, FIG. 7 is a flow chart for deploying a modeled decision service to a managed system. For clarity of presentation, the description that follows generally describes method 700 in the context of FIGS. 1, 2, 4, 5, and 6. However, it will be understood that method 700 may be performed, for example, by any other suitable system, environment, software, and hardware, or a combination of systems, environments, software, and hardware as appropriate. For example, one or more of the business suite server, the client, or other computing device (not illustrated) can be used to execute method 700 and obtain any data from the memory of the client, the business suite server, or the other computing device (not illustrated).

At 702, objects associated with the decision service on the BRM application are locked to prevent conflicts/modifications during deployment. In some implementations, all objects associated with the decision service are locked. In other implementations, a subset of the related objects is locked. From 702, method 700 proceeds to 704.

At 704, code is generated implementing the decision service. The generated code may be fully or partially written or described in any appropriate computer language including C, C++, Objective C, Java, Visual Basic, assembler, Perl, any suitable version of 4GL, as well as others. From 704, method 700 proceeds to 706.

At 706, an XML definition/implementation of the generated decision service is extracted from the generated code. From 706, method 700 proceeds to 708.

At 708, the managed system is locked to prevent conflicts/modifications during deployment. From 708, method 700 proceeds to 710.

At 710, the generated code and extracted XML are transferred to the locked managed system. From 710, method 700 proceeds to 712.

At 712, the transferred generated code and extracted XML is inserted into the managed system as a decision service and the decision service catalog is updated to reflect the inserted decision service. From 712, method 700 proceeds to 714.

At 714, the managed system locks are released. After 714, method 700 stops.

Figure 8:
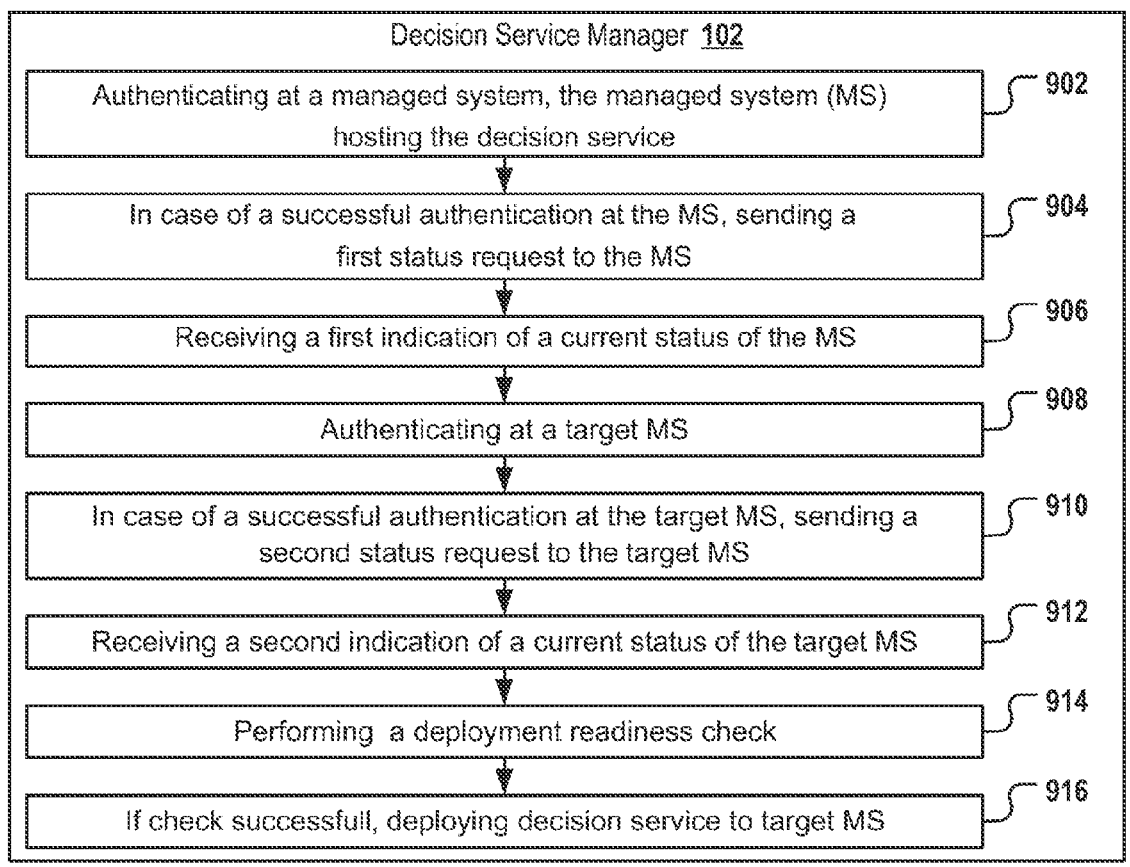
FIG. 8 is a further flow chart for deploying a modeled decision service to a managed system executed by the decision service manager.

FIG. 8 shows a flow chart comprising method steps to be executed by a decision service manager 102 for deploying a decision service to a target managed system. At step 902, the DSM authenticates at a managed system, the managed system hosting the decision service. In case of a successful authentication at the managed system, the DSM sends in step 904 a first status request to the managed system (MS). In step 906, the DSM receives, in response to the first status request, a first indication of a current status of the first MS. In step 908, the DSM tries to authenticate at the target MS. In case of a successful authentication at the target MS, the DSM sends in step 910 a second status request to the target MS and receives in step 912, as a response, a second indication of a current status of the target MS. In step 914 the DSM executes a deployment readiness check, whereby the first and the second indications are compared with each other. In case the deployment readiness check returns as result that a current status of the target managed system allows the target managed system to host the decision service, the DSM automatically deploys in step 916 the decision service to the target MS.

Figure 9:
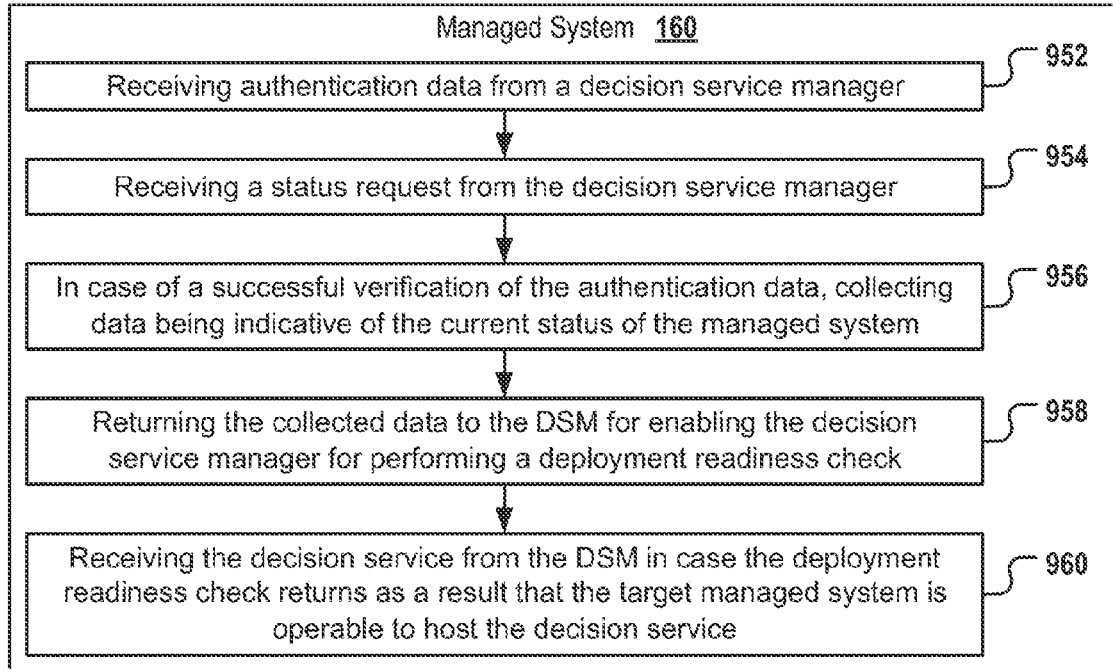
FIG. 9 is a flow chart for deploying a modeled decision service to a managed system executed by the managed system or a plug-in component thereof.

FIG. 9 shows a flow chart comprising method steps to be executed by the target managed system (MS) 160 or a plug-in thereof for deploying a decision service at the target MS. At step 952, the target MS receives authentication data from a decision service manager. The authentication data may be a signature of a secret shared with the DSM. In step 954, the target MS receives a status request from the decision service manager. In case of a successful verification of the authentication data, the target MS in step 956 collects data being indicative of a current status of the target MS and returns the collected data in step 958 to the DSM. Thereby, the DSM is enabled to perform a deployment readiness check. In step 960, the target MS receives the decision service from the DSM in case the deployment readiness check was executed successful.

As used in the present disclosure, the term "computer" is intended to encompass any suitable processing device. For example, although FIG. 1 illustrates a single DSM server 102, client 140, and managed system 160, example distributed computing system 100 can be implemented using two or more DSM servers 102, clients 140, and managed systems 160. The example distributed computing system 100 can also be implemented with computers other than servers. For example, although FIG. 1 illustrates DSM server 102 as a server, the DSM server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, computers in example distributed computing system 100 may be adapted to execute any operating system, including LINUX, UNIX, WINDOWS, MAC OS, JAVA, ANDROID, IOS or any other suitable operating system.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component within or interfacing with the example distributed computing system 100 may be fully or partially written or described in any appropriate computer language including C, C++, Objective C, Java, Visual Basic, assembler, Perl, any suitable version of 4GL, as well as others. While portions of the software illustrated in the various figures are shown as individual modules that implement the various features and functionality through various objects, methods, or other processes, the software may instead include a number of submodules, third party services, components, libraries, and such, as appropriate. Conversely, the features and functionality of various components can be combined into single components as appropriate.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, the example distributed computing system 100 may use processes with additional steps, fewer steps, and/or different steps, so long as the methods remain appropriate. Process steps may also be executed and described software/services may also execute on various components of the example distributed computing system 100 so long as the methods remain appropriate.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, the method comprising:
a decision service manager authenticating at a managed system, the managed system hosting a decision service;
in case of a successful authentication at the managed system, the decision service manager sending a first status request to the managed system;
the decision service manager receiving, in response to the first status request, a first indication of a current status of the managed system;
the decision service manager authenticating at a target managed system;
in case of a successful authentication at the target managed system, the decision service manager sending a second status request to the target managed system;
the decision service manager receiving, in response to the second status request, a second indication of a current status of the target managed system;
the decision service manager performing a deployment readiness check, the check comprising comparing the first and the second indication; and
in case the deployment readiness check returns as result that a current status of the target managed system allows the target managed system to host the decision service, automatically, by a hardware processor, deploying the decision service to the target managed system.

2. The computer-implemented method of claim 1, further comprising:
the decision service manager outputting the second indication to a user of the decision service manager; and
the decision service manager receiving the decision service from the user, the decision service being received in a modified form, the modifications of the decision service having been implemented in accordance with the current status of the target managed system.

3. The computer-implemented method of claim 1, wherein the first indication comprises a specification of resources being available at the managed system and comprises a description of each decision service being currently hosted on the managed system, wherein the resources are, in particular, available databases and respective access credentials, database tables, network cards, processors, memory, storage, bus systems, device interfaces and available program libraries.

4. The computer-implemented method of claim 1, wherein deploying the decision service comprises transferring executable code and a service description file to the target managed system, wherein the executable code upon execution by the target managed system provides the deployed decision service and wherein a content of the service description files of all decision services currently being deployed to the target managed system are returned as response in case the target system receives a status request from the decision service manager.

5. The computer-implemented method of claim 1, the authentication of the decision service manager at the managed system being based on:
providing a public key to the managed system;
providing a private key to the decision service manager, the public and the private key forming an asymmetric cryptographic key pair; and
wherein the authentication of the decision service manager at the managed system comprises:
the decision service manager signing a secret shared between the decision service manager and the managed system with the private key;
the decision service manager sending a signed data value to the managed system; and
the target managed system decrypting and evaluating a signature with its public key.

6. The computer-implemented method of claim 1, wherein the deployment readiness check is based upon criteria of the target managed system, including the decision services currently deployed to the target managed system, available resources at the target managed system and on requirements of the service to be deployed, the criteria including at least one of: that the decision service to be deployed does not depend on any resource not available in the target managed system, that the decision service to be deployed does not depend on any other decision service not already been deployed in the target managed system, or that the managed system responded to a request for availability by the decision service manager with an acknowledgement.

7. A computer-implemented method, the method comprising:
receiving authentication data from a decision service manager;
receiving a status request from the decision service manager;
in case of a successful verification of the authentication data, collecting data being indicative of a current status of a managed system;

returning the collected data to the decision service manager for enabling the decision service manager for performing a deployment readiness check;

receiving a decision service from the decision service manager in case the deployment readiness check returns as a result that a target managed system is operable to host the decision service; and deploying the decision service on the target managed system.

8. The computer-implemented method of claim 7, wherein the method is executed by a business rule service package being installed on the target managed system as a plug-in interfacing with the decision service manager.

9. The computer-implemented method of claim 8, wherein the plug-in further interfaces with one or more client computers, the method comprising:

receiving a service call from one of the one or more client computers, the service call requesting a service provided by the deployed decision service;

extracting a service time from the service call;

accessing a service catalog, the service catalog comprising a mapping of decision services currently deployed in the target managed system and respective availability periods of said decision services;

calling, by the business rule service package, the requested decision service if its assigned availability period according to the mapping covers the service time, and returning a result of the called decision service to the client computer; and if the availability period assigned to the requested decision service does not cover the service time, denying execution of the service request.

10. The computer-implemented method of claim 9, further comprising:

in case the service call does not comprise a specification of the service time, using a current time as the service time.

11. The computer-implemented method of claim 9, further comprising:

switching from test mode into productive mode or vice versa; and executing the service call by calling the requested decision service, whereby any data generated by the called decision service in test mode is managed and stored separately from any data generated by the called decision service in productive mode.

12. The computer-implemented method of claim 7, further comprising:

after having received the decision service to be deployed and after having initiated said decision service, locking objects in the target managed system being associated with the deployed decision service, the locking comprising prohibiting any redeployment or un-deployment of other decision services hosted by the targeted managed system from which said deployed and initiated decision service depends.

13. The computer-implemented method of claim 12, further comprising:

evaluating a service description file of the decision service received by the target managed system upon deployment of the decision service;

extracting an availability period being indicative when the deployed decision service is permitted to execute on the target managed system; and storing the extracted availability period in association with an identifier of the deployed decision service in mapping contained in a service catalog.

14. The computer-implemented method of claim 13, further comprising:

evaluating the mapping on a regular basis;

in case it is determined that a validity period of any decision service deployed to the target managed system has begun, initiating the respective decision service; and in case it is determined that the validity period of any decision service deployed to the target managed system has ended, stopping execution of the respective decision service.

15. A non-transitory, computer-readable medium storing computer-readable instructions executable by a hardware processor and configured to:

receive authentication data from a decision service manager;

receive a status request from the decision service manager;

in case of a successful verification of the authentication data, collecting data being indicative of a current status of a managed system;

return the collected data to the decision service manager for enabling the decision service manager for performing a deployment readiness check;

receive a decision service from the decision service manager in case the deployment readiness check returns as a result that a target managed system is operable to host the decision service; and deploy the decision service on the target managed system.

16. The computer-readable medium of claim 15, wherein the computer-readable instructions comprise a business rule service package being installed on the target managed system as a plug-in interfacing with the decision service manager.

17. The computer-readable medium of claim 16, wherein the plug-in further interfaces with one or more client computers and is configured to:

receive a service call from one of the one or more client computers, the service call requesting a service provided by the deployed decision service;

extract a service time from the service call;

access a service catalog, the service catalog comprising a mapping of decision services currently deployed in the target managed system and respective availability periods of said decision services;

call, by the business rule service package, the requested decision service if its assigned availability period according to the mapping covers the service time, and return a result of the called decision service to the client computer; and if the availability period assigned to the requested decision service does not cover the service time, deny execution of the service request.

18. A computer system, comprising:

a hardware memory;

at least one hardware processor interoperably coupled with the hardware memory and configured to:

receive authentication data from a decision service manager;

receive a status request from the decision service manager;

in case of a successful verification of the authentication data, collecting data being indicative of a current status of a managed system;

return the collected data to the decision service manager for enabling the decision service manager for performing a deployment readiness check;

receive a decision service from the decision service manager in case the deployment readiness check returns as a result that a target managed system is operable to host the decision service; and deploy the decision service on the target managed system.

19. The computer system of claim 18, further configured to execute by a business rule service package being installed on the target managed system as a plug-in interfacing with the decision service manager.

20. The computer system of claim 19, wherein the plug-in further interfaces with one or more client computers and is configured to:

receive a service call from one of the one or more client computers, the service call requesting a service provided by the deployed decision service;

extract a service time from the service call;

access a service catalog, the service catalog comprising a mapping of decision services currently deployed in the target managed system and respective availability periods of said decision services;

call, by the business rule service package, the requested decision service if its assigned availability period according to the mapping covers the service time, and return a result of the called decision service to the client computer; and if the availability period assigned to the requested decision service does not cover the service time, deny execution of the service request.

21. A computer-implemented method, comprising:

a decision service manager authenticating at a managed system, the managed system hosting a decision service;

in case of a successful authentication at the managed system, the decision service manager sending a first status request to the managed system;

the decision service manager receiving, in response to the first status request, a first indication of a current status of the managed system, wherein the first indication comprises a specification of resources being available at the managed system and comprises a description of each decision service being currently hosted on the managed system, wherein the resources are, in particular, available databases and respective access credentials, database tables, network cards, processors, memory, storage, bus systems, device interfaces and available program libraries;

the decision service manager authenticating at a target managed system;

in case of a successful authentication at the target managed system, the decision service manager sending a second status request to the target managed system;

the decision service manager receiving, in response to the second status request, a second indication of a current status of the target managed system, the decision service manager outputting the second indication to a user of the decision service manager and receiving the decision service from the user, the decision service being received in a modified form, the modifications of the decision service having been implemented in accordance with a current status of the target managed system;

the decision service manager performing a deployment readiness check, the check comprising comparing the first and the second indication and based upon criteria of the target managed system, including the decision services currently deployed to the target managed system, available resources at the target managed system and on requirements of the service to be deployed, the criteria including at least one of: that the decision service to be deployed does not depend on any resource not available in the target managed system; that the decision service to be deployed does not depend on any other decision service not already been deployed in the target managed system; or that the managed system responded to a request for availability by the decision service manager with an acknowledgement; and in case the deployment readiness check returns as result that the current status of the target managed system allows the target managed system to host the decision service, automatically, by a hardware processor, deploying the decision service to the target managed system, wherein deploying the decision service comprises transferring executable code and a service description file to the target managed system, wherein the executable code upon execution by the target managed system provides the deployed decision service and wherein content of the service description files of all decision services currently being deployed to the target managed system are returned as response in case the target system receives a status request from the decision service manager.

* * * * *